June 8, 1965 C. BOWNESS 3,188,582
RECTANGULAR WAVEGUIDE MICROWAVE AMPLITUDE MODULATOR WITH
A PLANAR RESISTIVE ATTENUATOR EXTENDING ALONG
FERROMAGNETIC ROD
Original Filed Sept. 28, 1959 4 Sheets-Sheet 1

INVENTOR
COLIN BOWNESS
BY H. Vincent Harsha
ATTORNEY

United States Patent Office 3,188,582
Patented June 8, 1965

3,188,582
RECTANGULAR WAVEGUIDE MICROWAVE AM-
PLITUDE MODULATOR WITH A PLANAR RE-
SISTIVE ATTENUATOR EXTENDING ALONG
FERROMAGNETIC ROD
Colin Bowness, Weston, Mass., assignor to Raytheon
Company, Waltham, Mass., a corporation of Delaware
Continuation of application Ser. No. 842,690, Sept. 28,
1959. This application Jan. 10, 1964, Ser. No. 339,063
6 Claims. (Cl. 333—24.2)

This is a continuation of my copending application, Serial No. 842,690, filed September 28, 1959, now abandoned.

The present invention relates to the art of modulating high frequency electromagnetic energy. More particularly, this invention relates to attenuation and modulation of high frequency electromagnetic energy as propagated in waveguides and other transmission lines.

It is often required to alter the amplitude of a microwave signal in a waveguide by means of some external control. Amplitude modulation of microwave energy in a transmission line may be obtained, for example, by alternately introducing and removing attenuation. This may be accomplished mechanically by the insertion and removal of a resistive vane in the plane of electric polarization at the desired rate. As the modulation frequency increases mechanical problems multiply and a more elegant prior art solution contemplates the use of ferrite in a variable magnetic field. Two commonly used methods, for example, are the use of ferromagnetic resonance phenomenon and the use of Faraday rotation in a circular waveguide. Use of these techniques requires means for matching input and output to standard rectangular waveguide and acceptable results may be obtained only when this problem is solved. The use of ferrite in a variable magnetic field makes it possible to rotate the plane of electric polarization in the transmission line into a fixed resistive element or to distort the electric field in such a way that a component is induced in the plane of the resistive element. Most low-power ferrite amplitude modulators in the prior art rely for their operation on rotation of the plane of polarization. A typical reciprocal amplitude modulator of this type is shown in FIG. 1 for purposes of comparison with the present invention. The rotation of polarization $\theta$ is proportional to the magnetic field and the transmitted field is proportional to $\cos^2\theta$.

Such Faraday rotation may also be considered as being due to a uniform distributed coupling between the vertically and horizontally polarized waves in the circular section. This distributed coupling is between transverse components of the RF magnetic field within the ferrite and is due to the electron spins precessing about the direction of D.C. magnetization. When the two modes of propagation have the same phase velocities, it is possible to transfer all the energy from one mode to the other. The process is continuous and in a long line the energy will cycle from one mode to the other. The period depends upon the coupling coefficient, which is a function of the applied magnetic field.

This approach is convenient when considering a square or circular waveguide in which an axial ferrite rod is used as the coupling mechanism between the dominant TE modes. In square or circular waveguide the phase velocities are equal, and in a given length of line the proportion of energy coupled from one mode to the other will depend upon the applied field. In standard rectangular waveguide having unequal cross-sectional dimensions, within the recommended frequency range, the horizontally polarized modes are cut off. The presence of a ferrite rod will alter the transmission constants of the waveguide, but if the diameter of the rod is sufficiently small to preclude propagation in the horizontal mode at the frequencies of interest, any energy radiated into this mode must be re-radiated in the vertically polarized mode. The effect of such re-radiated energy is a change in the phase constant of the transmission line as a whole, hence phase shift may be controlled in this manner by the applied magnetic field. The operation of reciprocal phase shifts is well known in the art and is discussed in "A New Technique in Ferrite Phase-Shifting for Beam Scanning of Microwave Antennas" by F. Reggia and E. G. Spencer, Proceedings of the IRE, volume 45, pp. 1510–1517, November 1957.

Proceeding from the hypothesis given immediately hereinabove, in accordance with the present invention the difficulties and disadvantages noted hereinbefore and associated with prior art amplitude modulators are overcome by placing parallel to the broad or wide walls of a standard rectangular waveguide a resistive vane or vanes located along the length of and preferably in contact with a ferrite rod which in turn is located on the axis of the rectangular waveguide. By providing resistive rectangular vanes in accordance with the invention an applied microwave signal may be attenuated by application of a longitudinal magnetic field, thereby resulting in an amplitude modulator having substantial advantages over known prior art devices. Among the many advantages of the present invention some of the more important are that the magnetic field required for operation is low, being only that required to saturate the ferrite, i.e., of the order of 100 oersteds, hence modulation may be simply achieved by winding a coil on the waveguide and applying a suitable voltage; the device operates in standard rectangular waveguide and requires no bandwidth limiting transitions; and simple broadbanding techniques such as, for example, ridging the waveguide or dielectric loading of the waveguide may be effectively used.

In standard rectangular waveguide it is possible to achieve attenuations of 30 decibels or more over narrow frequency bands by use of the technique disclosed herein and if a ridged waveguide technique is used, for example, to broadband the device an amplitude modulator may be made capable of about fifty percent modulation over the entire recommended frequency range of X-band waveguide (8.2 to 12.4 kmc./s.) having an attenuation for a given applied magnetic field that is substantially constant across this frequency band.

These and other objects and features of the invention, together with their incident advantages, will be more readily understood and appreciated from the following detailed description of the preferred embodiments thereof selected for purposes of illustration and shown in the accompanying drawings in which.

Figure 1:
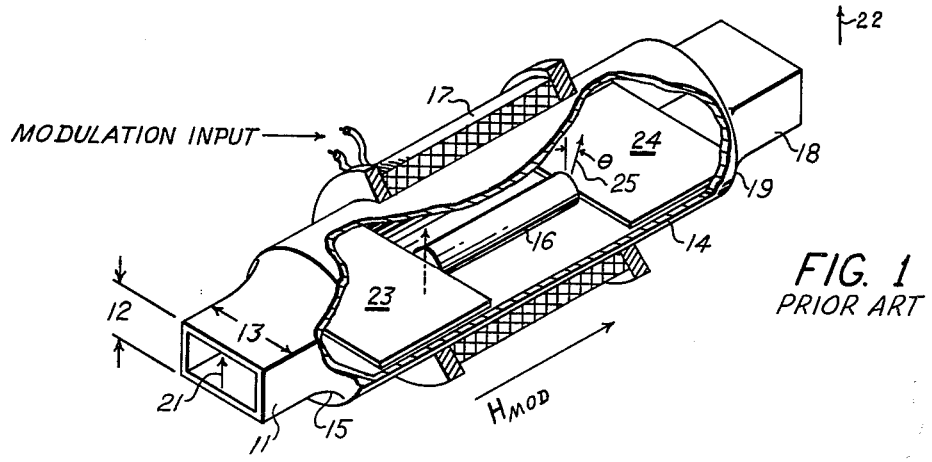
FIG. 1 is a perspective view of a prior art amplitude modulator.

With reference now to FIG. 1 which is exemplary of conventional prior art devices, a rectangular input waveguide 11 constructed, for example, of copper has a transverse dimension 12 less than a half-wave long at the operating frequency and the other transverse dimension 13 is greater than a half-wave long at the operating frequency. A cylindrical waveguide 14 is electrically and mechanically coupled to the input guide 11 by a conventional transition section 15 as shown. A ferrite rod 16 is located on the axis of the cylindrical waveguide 14. A coil 17 surrounds the cylindrical waveguide 14 and ferrite rod 16 as shown. A rectangular output waveguide 18 identical in configuration and orientation to the input waveguide 11 is electrically and mechanically coupled to the output end of the cylindrical waveguide 14 by a transition section 19 identical to transition section 15.

A bias magnetic field may be provided by a suitable bar magnet (not shown) and microwave electromagnetic energy characterized by an electric vector having a polarity in the direction as shown at 21 is coupled to the guide 11 in well-known manner. A suitable modulating voltage is applied to the coil 17 to cause an alternating magnetic current to flow longitudinally through the ferrite rod 16. In accordance with the so-called Faraday effect as applied to microwave energy, the magnetic current parallel to the rod 16 causes the electric vector of the energy to rotate in accordance with the variations of the current in the coil 17.

The amount of rotation that takes place is also a function of the length and diameter of the ferrite rod. In most prior art embodiments, the electric vector is rotated ±90 degrees about a mean position determined by the steady state transverse magnetic field. That is to say, it rotates 90 degrees clockwise and 90 degrees counterclockwise in accordance with the maximum amplitude in opposite polarities of the magnetic current.

As is well known in the art, the guide 18 propagates that component of electromagnetic energy having an electric vector polarized in the direction as shown at 22. As is well known the rotation of polarization $\theta$ is proportional to the magnetic field produced by the modulating voltage and the transmitted power accepted by guide 18 is proportional to $\cos^2 \theta$ since the orientation of guides 11 and 18 about the longitudinal axis of the device is identical.

Coplanar vanes 23–24 are provided as shown in FIG. 1. The vanes 23–24 are relatively thin rectangular sheets of resistive material attached along a diameter of the guide 14 adjacent the ends of the rod 16 parallel to the direction of the propagation of the energy therein and perpendicular to its electric vector. Upon application of a modulating voltage to the coil 17, an alternating magnetic current passes longitudinally through rod 16. Energy passing rod 16 is characterized by a rotating vector 25 having instantaneous positions at times perpendicular and at times parallel to vane 24 (and vane 23). Since the vane 24 (or vane 23) permits only that component of the energy having an electric vector perpendicular thereto to pass (as shown at 22), modulation is obtained.

Figure 2:
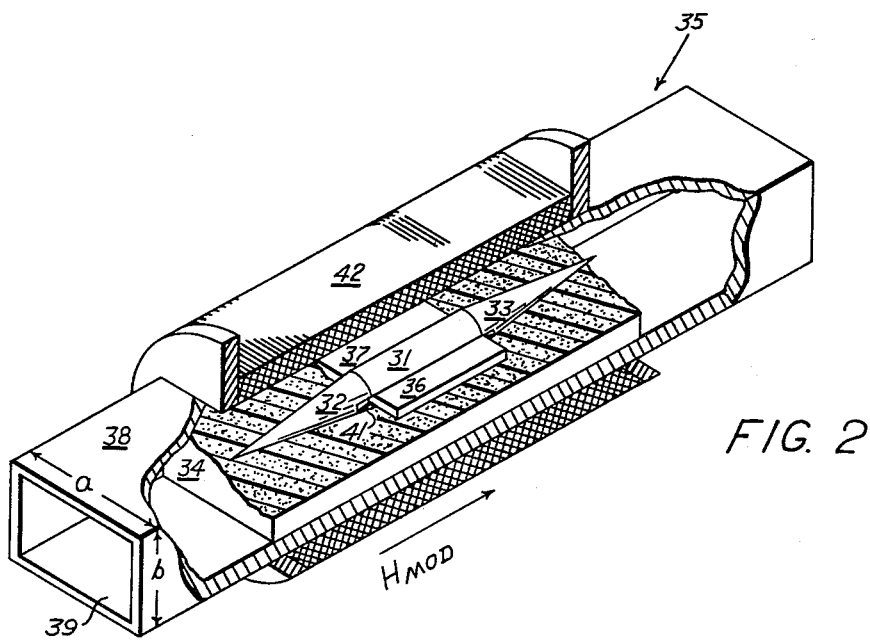
FIG. 2 is a perspective view, with parts broken away for clarity, of one embodiment of the invention.

With reference now to FIG. 2 an embodiment of an X-band reciprocal modulator constructed in accordance with the present invention comprises a ferrite rod 31 tapered at both ends 32–33 to give a good impedance match over a wide range of frequencies and magnetizing fields is supported by a suitable dielectric material 34, such as Styrofoam, on the longitudinal axis of a standard copper rectangular waveguide 35 having $a$ and $b$ dimensions suitable for X-band transmission such as, for example, respectively one inch and one-half inch. Resistive vanes 36–37 parallel to the wide sides 38–39 of the waveguide 35 and extending outwardly from the ferrite rod are each carried in a long slot 41. Other suitable means such as disks, metal pins and the like may be used to support the rod 31. An axial magnetic field is provided by solenoid 42 to which is coupled the modulating signal. In an embodiment that operated satisfactorily at X-band frequencies (8.2 to 12.4 kmc./s.) the ferrite rod 31 was composed of R–151, a commercially available magnesium-manganese ferrite, whose dielectric and low-field losses are small at X-band frequencies. The ferrite rod 31 was three inches long and had a diameter in the range of .150 to .250 inch and was provided with a one inch taper 32–33 at its ends. The solenoid 42 was approximately two inches long and the resistive vanes 36–37 were about two inches long, .200 inch wide and were located in slots 41 that were about 0.3 inch deep. With the one inch long tapers the VSWR rarely exceeded 1.20. The electrical characteristics as functions of frequency, rod diameter, and vane resistivity are shown in FIGS. 3, 4, 5, 6 and 7.

Figure 3:
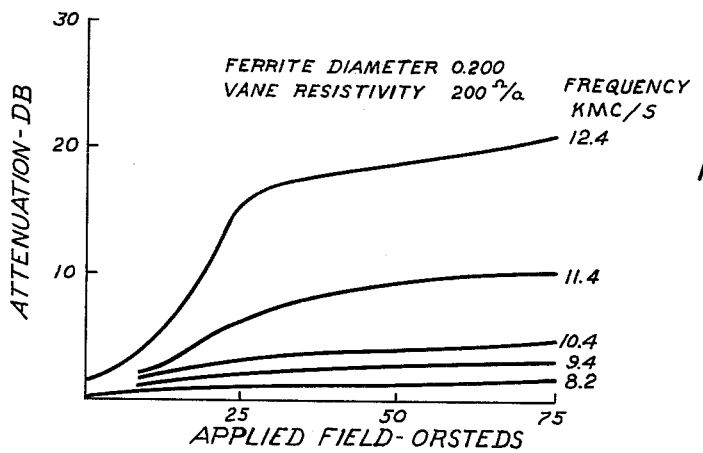
FIGS. 3–7 are graphic representations of operating characteristics of the invention.

FIG. 3 shows typical curves of attenuation versus applied axial field for a 0.200 inch diameter rod and various frequencies. The surface resistivity of the vanes was 200 ohms per square where ohms per square is determined in conventional manner for measuring resistivity. At low levels of internal field, coupling into the resistive vane is approximately proportional to the magnetization of the ferrite. Therefore, the attenuation curves as shown in FIG. 3 take on the general form of a magnetization curve and since the longitudinal demagnetizing factor of the rod is small, the ferrite saturates at a low applied field and the attenuation tends towards a limit as shown.

As may be seen by reference to FIG. 3, the attenuation increases rapidly with frequency, and this may be explained in the following manner. The waveguide is partially loaded with ferrite having a high dielectric constant and, as the frequency increases, the electromagnetic energy concentrates more and more in the rod, which acts as a dielectric waveguide. Moreover, the impedance of a TE mode in a waveguide decreases with increasing frequency, and consequently the transverse RF magnetic field increases. Both effects result in an increase in the transverse RF magnetic field within the rod, and therefore the ferrite couples a greater intensity of RF electric field into the resistive vanes 36 and 37.

Figure 4:
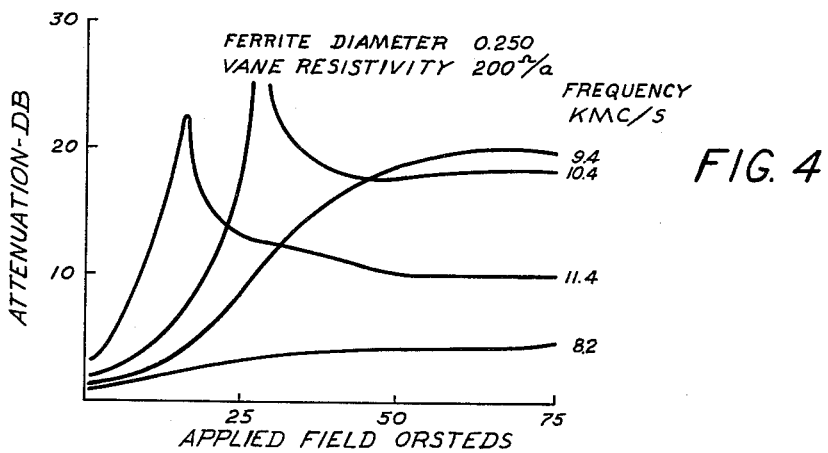

In order to clearly show the effects and the limits of variations of the diameter of the ferrite rod the characteristics of a 0.250 inch diameter rod are shown in FIG. 4. With the increase in rod diameter more energy travels within the rod at a given frequency, and it is suggested that the curve for 9.4 kmc./s. in FIG. 4 marks the beginning of a transition from nonpropagation to a propagation of a wave polarized parallel to the greatest crosswise dimension of the waveguide. The existence of such a mode suggests one explanation of the peaks in attenuation on the 10.4 kmc./s. and 11.4 kmc./s. curves. The transfer of energy from one mode to the other is a function of both the length of the rod and the magnetization. When the combination of these factors is such that most of the remaining energy arrives at the end of the ferrite section polarized parallel to the widest crosswise dimension of the waveguide, it must be reflected, as it cannot propagate in the unloaded waveguide. The result would be a peak of attenuation at this magnetization.

Figure 5:
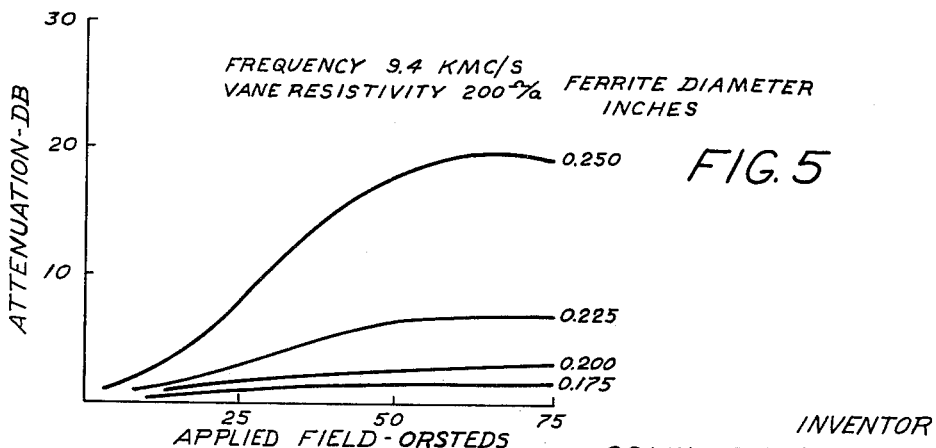
Figure 6:
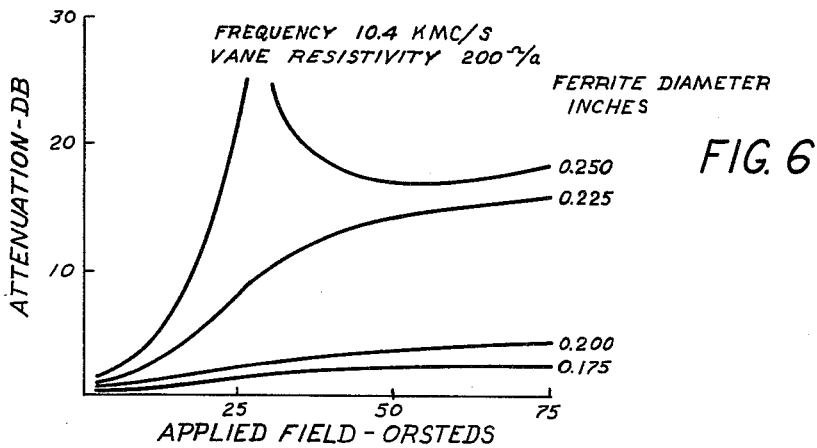

In dielectric waveguides the ratio of energy in the dielectric to total energy in the waveguide is determined by the ratio of rod diameter to wavelength. Therefore, an increase in rod diameter has approximately the same effect on energy concentration as an increase in frequency. This is shown in FIGS. 5 and 6 in which the curves are similar in form to those in FIGS. 3 and 4. However, the variable in each set is now diameter instead of frequency. The results indicate that a given characteristic may be obtained in a range of frequencies by a suitable choice of rod diameter.

Figure 7:
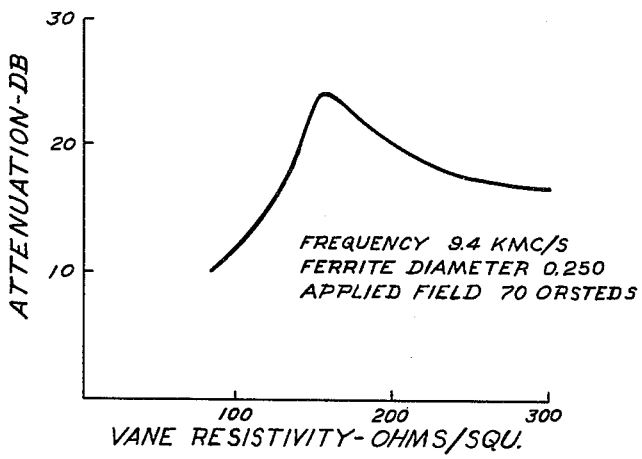

In FIG. 7 a curve is given of attenuation as a function of vane resistivity for a 0.250 inch diameter rod operating at a field of 70 oersteds at a frequency of 9.4 kmc./s. Inspection of FIG. 7 will show that maximum attenuation occurs at a surface resistivity of 160 ohms per square. It has been found that a reduction in the width of the vanes will reduce the surface resistivity at which maximum attenuation occurs. The shape of the curve will not change substantially with frequency.

An increase in length of the vanes and of the cylindrical center section of ferrite, from, for example, one to two inches, will give approximately twice the previous value of attenuation, as is to be expected.

The depth of the slot in the ferrite for receiving the resistive vanes may be increased, for example, from 0.030 to 0.060 inch without significant change and no significant change is obtained for vanes having a width in excess of one-fourth the $a$ or largest dimension of the waveguide.

To consider possible applications of the present invention, reference is now made to FIG. 5. The curves shown in FIG. 5 indicate that a 0.250 inch diameter rod is satisfactory for use in an amplitude modulator at 9.5 kmc./s. A D.C. biasing field would be required to give operation on a relatively linear portion of the characteristics. As the field levels required are low, an A.C. modulation power of a fraction of a watt would be sufficient to give 30 percent modulation with low harmonic distortion. It is also possible to operate the device with no D.C. biasing field, in which case the modulation envelope varies at twice the modulation frequency, but this will introduce distortion.

If the slope of the attenuation characteristic and maximum attenuation reached are increased over the values given hereinabove by lengthening the center section, the device may be suitably used for pulsed modulation or on-off switching. With a one inch increase in length, a pulse field of 50 oersteds will give more than about 35 db of attenuation. The current regulation during the pulse need not be critical as the slope of the attenuation characteristic is small beyond the saturation point of the ferrite.

For those skilled in the art who will utilize the invention in one or more of the many applications for which it is suitable, attention is called to the fact that a limitation of the device is the sensitivity of the characteristics to a change in frequency.

Figure 8:
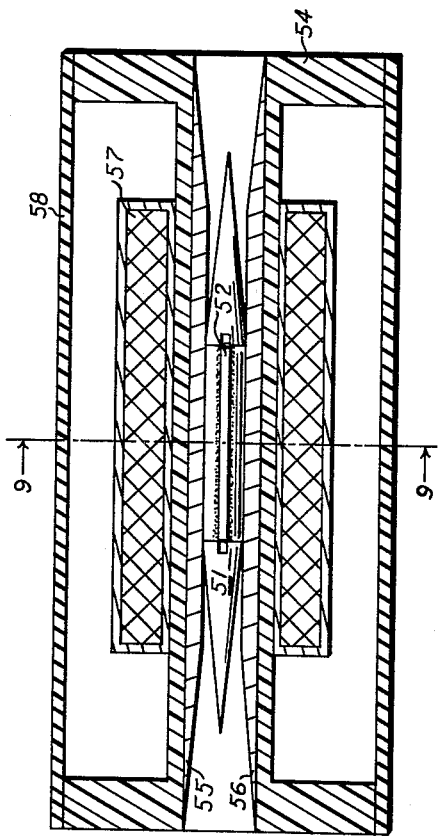
FIG. 8 is a sectional side view of another embodiment of the invention.
Figure 9:
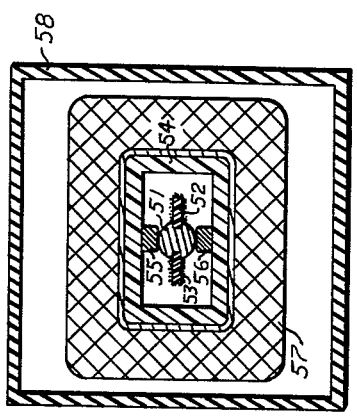
FIG. 9 is a sectional view of the modulator taken at line 9—9 in FIG. 8 in the direction of the arrows.

A modification of the invention is shown in FIGS. 8 and 9 which comprises a broadband modulator. As shown in FIGS. 8 and 9 a ferrite rod 51 and associated resistive vanes 52–53 substantially identical in composition and configuration as those described hereinabove, is supported on the longitudinal axis of a rectangular waveguide 54 having two coplanar metal ridges 55–56 integral with the broad walls of the waveguide 54. The ferrite rod 51 is bonded as by epoxy resin to each of the ridges 55–56 which provide excellent mechanical support for the ferrite rod 51. The ridges 55–56 are tapered to give the required impedance match over the desired bandwidth. Solenoid 57 provides the necessary axial magnetic field and a Mu-Metal shield 58 surrounds the device to screen it from stray external fields. It has been previously thought that the frequency sensitivity of devices of the type here concerned was due to two things; the change in TE wave impedances with frequency, and the change with frequency in the ratio of energy traveling within and without the ferrite rod. Both of these effects are considerably reduced by the introduction of broadbanding means such as ridges in the waveguide.

With modulation frequencies up to, for example, 20 kc./s., a thick-walled metal waveguide is impractical because eddy currents induced in the short-circuited turn formed by the waveguide produce a "bucking" magnetic field which results in a severely attenuated modulated field in frequency in excess of a few kilocycles per second.

Figure 10:
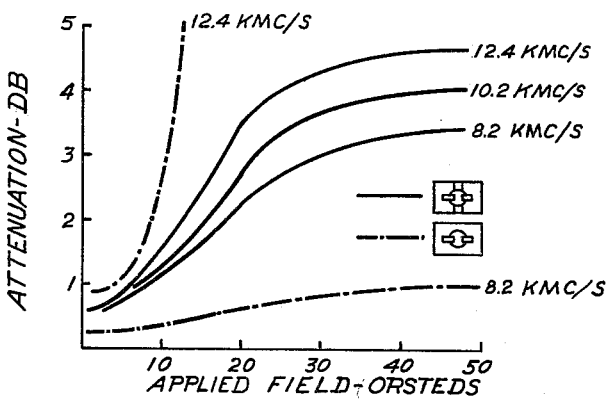
FIG. 10 is a graphic representation showing the attenuation characteristics for purposes of comparison of a modulator utilizing ridged waveguide and two curves for a 0.200 inch diameter ferrite rod in rectangular waveguide.

The attenuation characteristics of the modulator in ridged waveguide are given in FIG. 10 together with two curves for a 0.200 inch diameter rod in rectangular waveguide for the purposes of comparison. Using a biasing field of about 10 oersteds, and modulating with a peak-to-peak field of 4 oersteds, a peak to trough modulation of approximately 0.8 d.c. may be obtained, with an average insertion loss of about 1.5 db maximum at 12.4 kmc./s. When RF losses in the plastic waveguide are included, the average insertion loss will not exceed about 1.9 db.

It may now be obvious that there has been described a simple, effective low-power amplitude modulator that does not require bandwidth limiting transitions, that is inexpensive to manufacture, and that can be used, for example, as a conventional amplitude modulator or as an on-off switch. Since the modulator utilizes a rectangular waveguide, impedance matching over a wide band is easily obtained by tapering the ferrite rod disposed therein and variation of one parameter, the rod diameter, then permits a wide range of attenuation characteristics to be selected to provide a very efficient broadband and high frequency amplitude modulator.

In all cases, it is to be understood that the above-described arrangements are simply illustrative of a small number of the many possible specific embodiments which can represent applications of the principles of the invention. Numerous and varied other arrangements can readily be devised by those skilled in the art without departing from the spirit and scope of the invention.

What is claimed is:

1. A microwave modulator device comprising the combination of a rectangular waveguide having a longitudinal axis, means for applying a longitudinal magnetic field within the waveguide, a rodlike ferromagnetic element supported within the waveguide and having its longitudinal axis extending coaxially with the axis of said waveguide, and planar resistive means extending along the length of and supported by said rod and located wholly in a plane which is disposed parallel to the longer side walls of the waveguide, which plane extends through the ferromagnetic element, said planar resistive means terminating in end wall portions spaced from the narrower sidewalls of the waveguide.

2. A device as set forth in claim 1 wherein the ferromagnetic element is supported within the waveguide upon a body of dielectric material.

3. A device as set forth in claim 1 wherein the ferromagnetic element has tapered end portions to provide impedance matching over a wide range of frequencies and magnetic fields, and the planar resistive means extends between said tapered end portions.

4. A device as set forth in claim 1 wherein the means for applying a longitudinal magnetic field embodies a solenoid coil which encircles the waveguide.

5. A device as set forth in claim 1 wherein the planar resistive means comprises at least one planar element having at least a portion thereof inserted within the body of the ferromagnetic element.

6. In combination, a waveguide having a first electrically effective cross-sectional dimension longer than a half-wavelength at the desired operating frequency and a second electrically effective cross-sectional dimension shorter than a half-wavelength at the desired operating frequency, first and second inwardly-extending conductive ridges carried respectively by oppositely disposed inner surfaces of said waveguide, an elongate ferrite rod disposed intermediate said ridges and along the longitudinal axis of said waveguide, said rod having two oppositely-disposed grooves substantially parallel to said first cross-sectional dimension, first and second vanes of resistive material, each fixedly disposed in one of said grooves and extending outwardly from said rod, substantially parallel to said first cross-sectional dimension, each said vane being coextensive with at least the center portion of said rod and defining an end wall spaced from said second cross-sectional dimension, means bonding said rod to at least one of said ridges and holding said rod and said vane in spaced relationship to said waveguide, and means for applying a magnetic field to said ferrite rod substantially parallel to the axis of said waveguide.

References Cited by the Examiner
UNITED STATES PATENTS 3,018,454   1/62   Sferrazza _____ 333—81

FOREIGN PATENTS 123,581   11/59   USSR.

OTHER REFERENCES

Bowness et al.: Low Power Modulator, IRE Canadian Convention Record, Oct. 10, 1958, pages 475–479.

HERMAN KARL SAALBACH, *Primary Examiner.*